United States Patent [19]
Casson et al.

[11] Patent Number: 5,491,227
[45] Date of Patent: Feb. 13, 1996

[54] CONTROLLED MOLECULAR WEIGHT REDUCTION OF POLYMERS

[75] Inventors: Robert D. Casson; John A. Lovelady, both of Kent, England

[73] Assignee: Genzyme Limited, United Kingdom

[21] Appl. No.: 204,580

[22] Filed: Mar. 2, 1994

[51] Int. Cl.$^6$ ..................................................... C07G 17/00
[52] U.S. Cl. .............................. 536/124; 127/67; 127/69; 127/71
[58] Field of Search ................................ 536/124; 127/2, 127/9, 23, 69, 71, 67

[56] References Cited

U.S. PATENT DOCUMENTS

| | | | |
|---|---|---|---|
| 4,736,024 | 4/1988 | della Valle et al. | 536/55.3 |
| 5,011,701 | 4/1991 | Baer et al. | 426/573 |
| 5,087,471 | 2/1992 | Combes et al. | 426/573 |
| 5,123,962 | 6/1992 | Komuro et al. | 106/163.1 |
| 5,273,772 | 12/1993 | Cooper | 426/611 |

OTHER PUBLICATIONS

Hamai, A. et al. (1989) "Purification and Characterization of Hyaluronidase From *Streptococcus dysgalactiae*", *Agric. Biol. Chem.*, 53(8):2163–2168.

Armand, G. et al. (1983) "A New Chromatographic Method for the Fractionation of Hyaluronic Acid", *Biochem. & Biophys. Res. Comm.*, 112(1):168–175.

Van Brunt, J. (1986) "More to Hyaluronic Acid Than Meets the Eye" *Bio/Tech*, 4(9):780–782.

Keshavarz, E. et al. (1987) in *Separations for Biotechnology* (Verrill and Hudson eds.), Ellis Howard Ltd., Chichester, U.K., Chapter 3, 62–79.

Harris, M. J. et al. (1972) "Metal Calysis in the Depolymerization of Hyaluronic Acid", *J. Amer. Chem. Soc.*, 94(21):7570–7572.

Phipps, L. W. (1976) "Action of the High Pressure Homogenization" N.I.R.D., Paper No. 4426: 61–82.

Klein, J. et al. (1983) "Tissue Structure and Macro–Molecular Diffussion in Umbilical Cord Immobilization of Endogenous Hyaluronic Acid", *Biochem. et Biophys. Acta.*, 755:400–411.

*Primary Examiner*—Nathan M. Nutter
*Attorney, Agent, or Firm*—William G. Gosz

[57] ABSTRACT

A method for the controlled molecular weight reduction of a polymer which comprises subjecting the polymer to pressure homogenization is disclosed. The preferred polymers are polysaccharides, particularly hyaluronic acid.

1 Claim, 6 Drawing Sheets

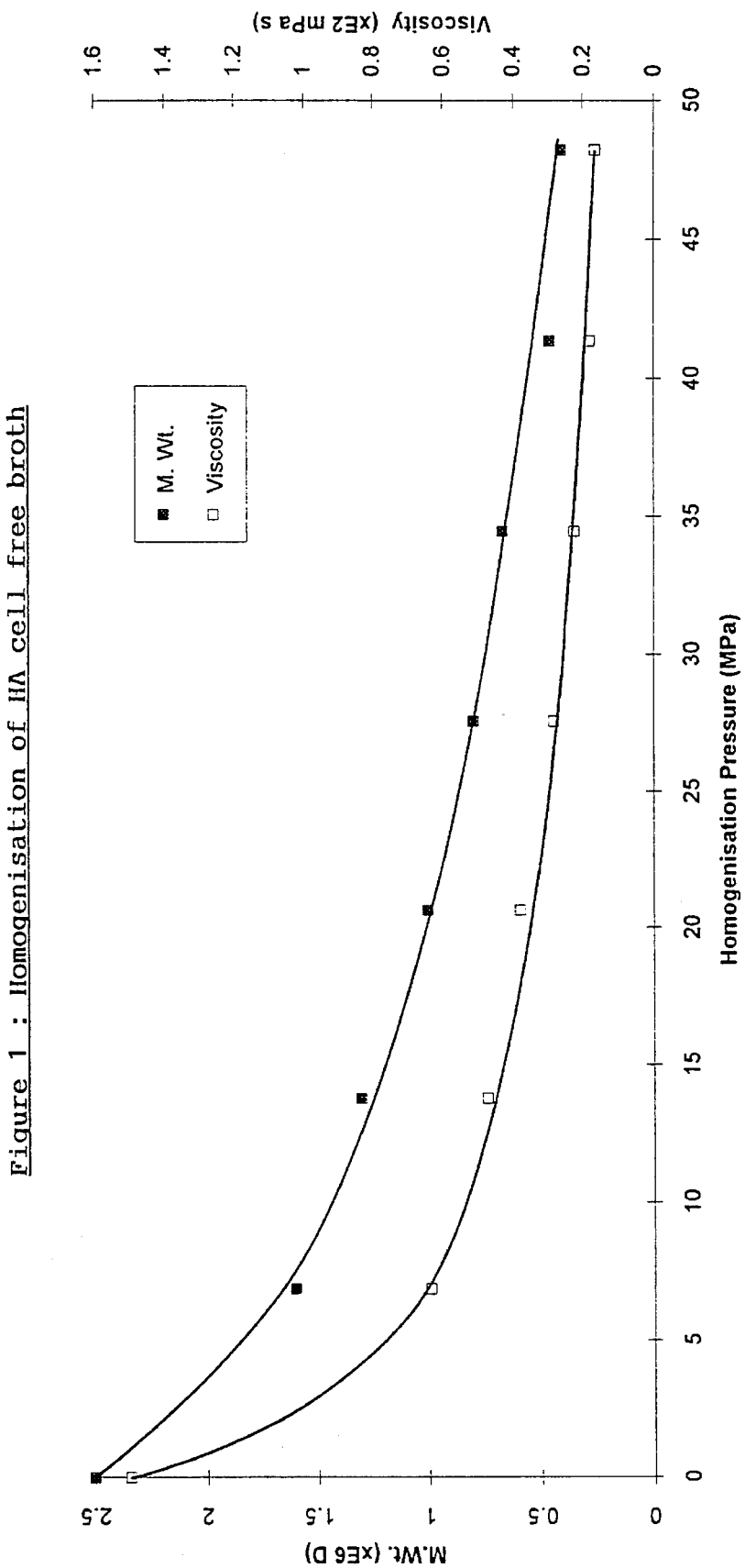
Figure 1 : Homogenisation of HA cell free broth

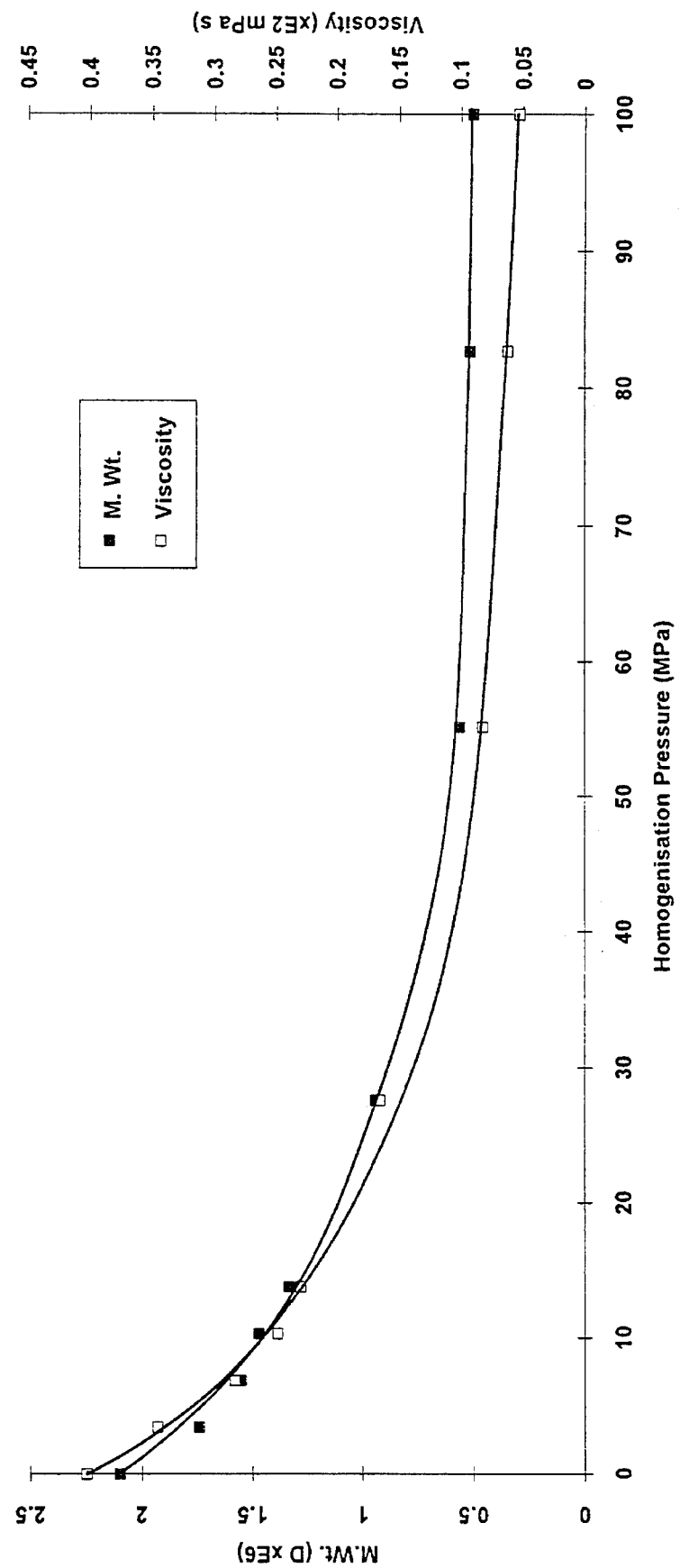
Figure 2 : Homogenisation of 0.1% HA

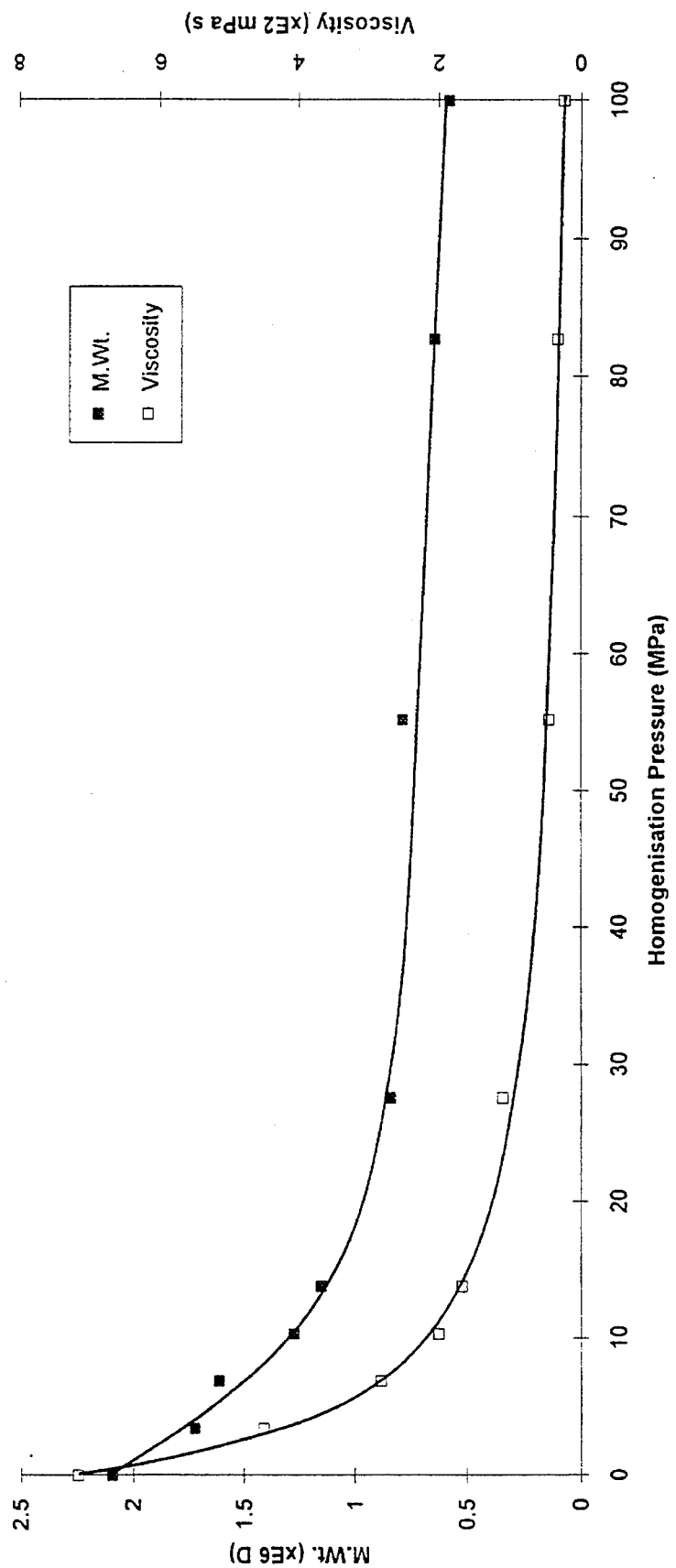
Figure 3 : Homogenisation of 0.4% HA

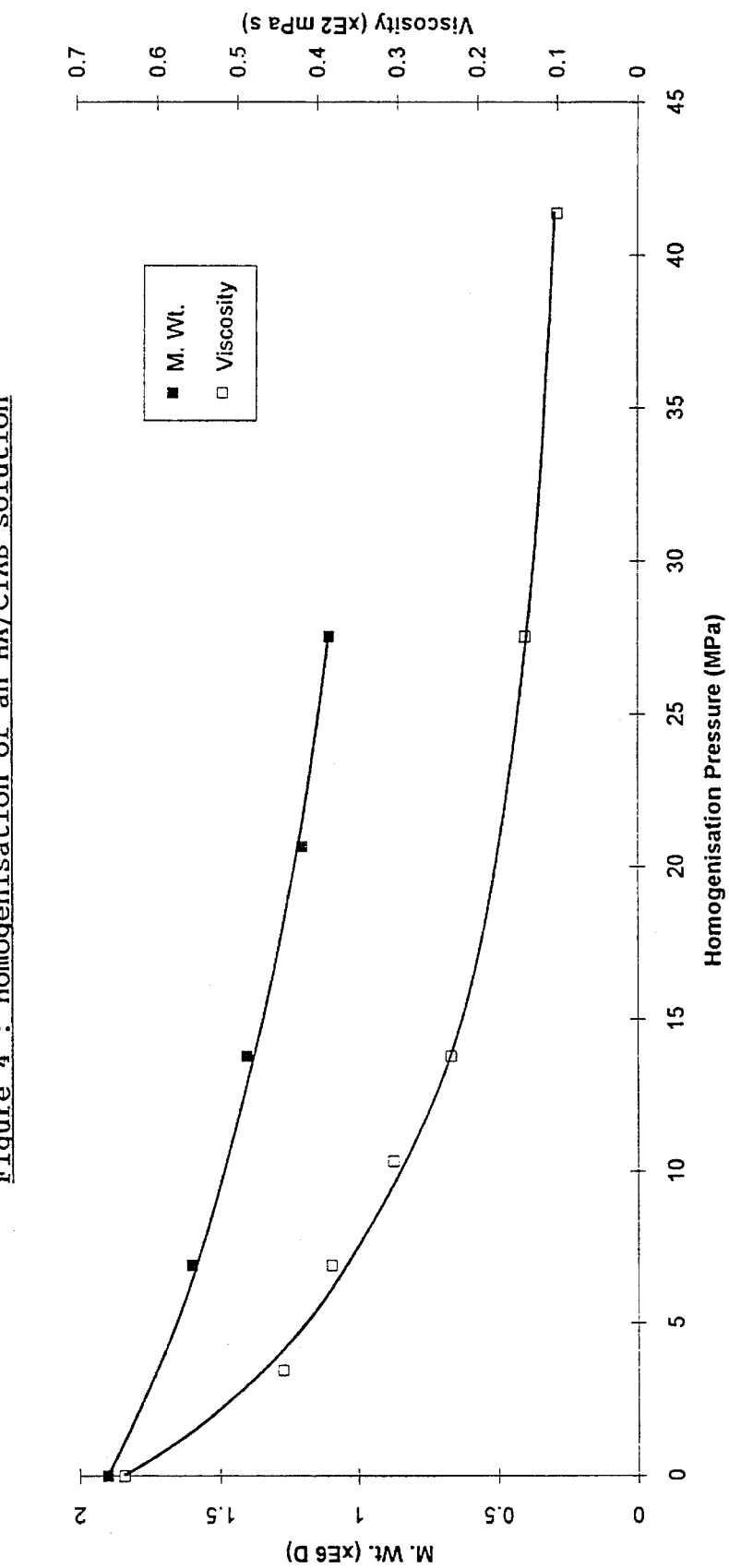
Figure 4: Homogenisation of an HA/CTAB solution

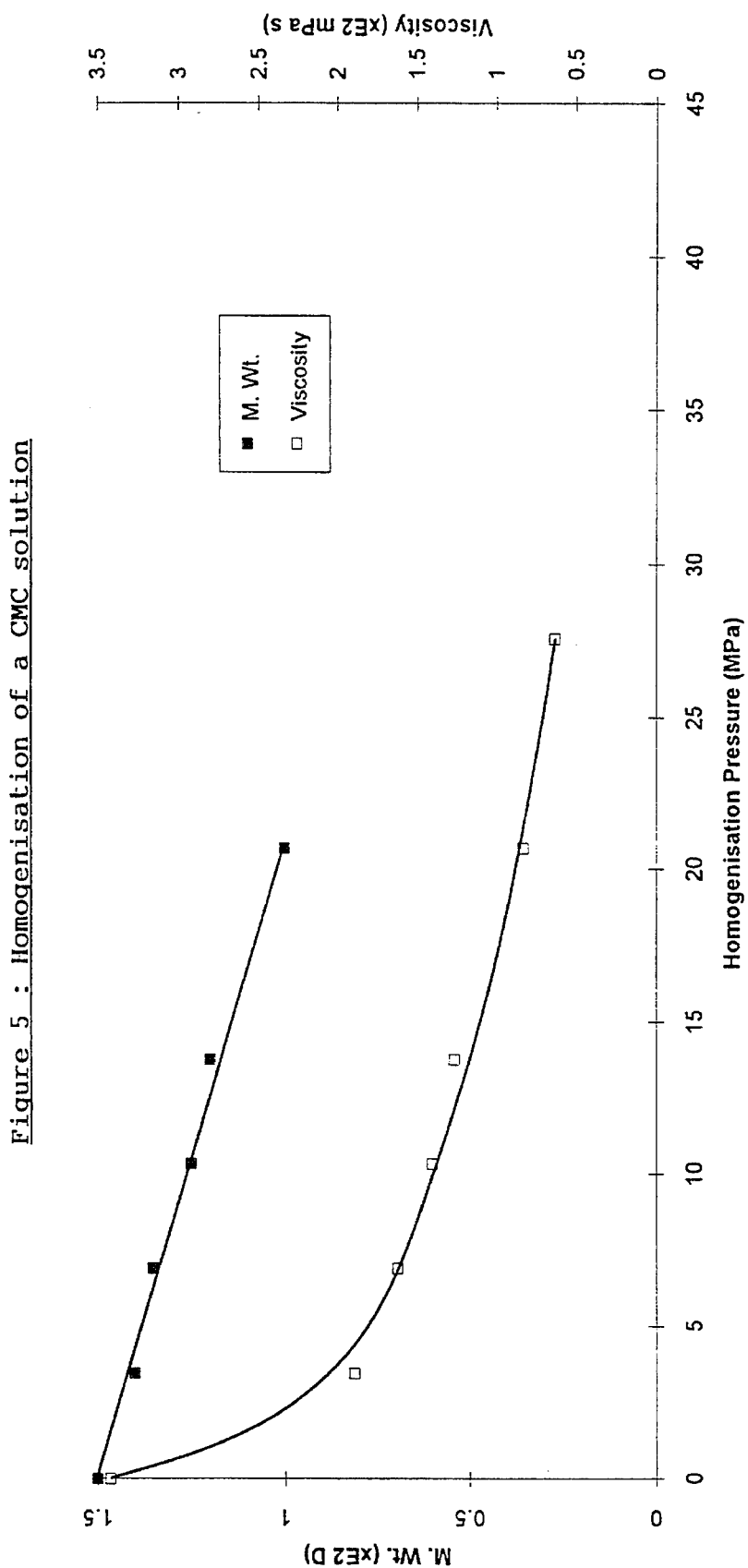

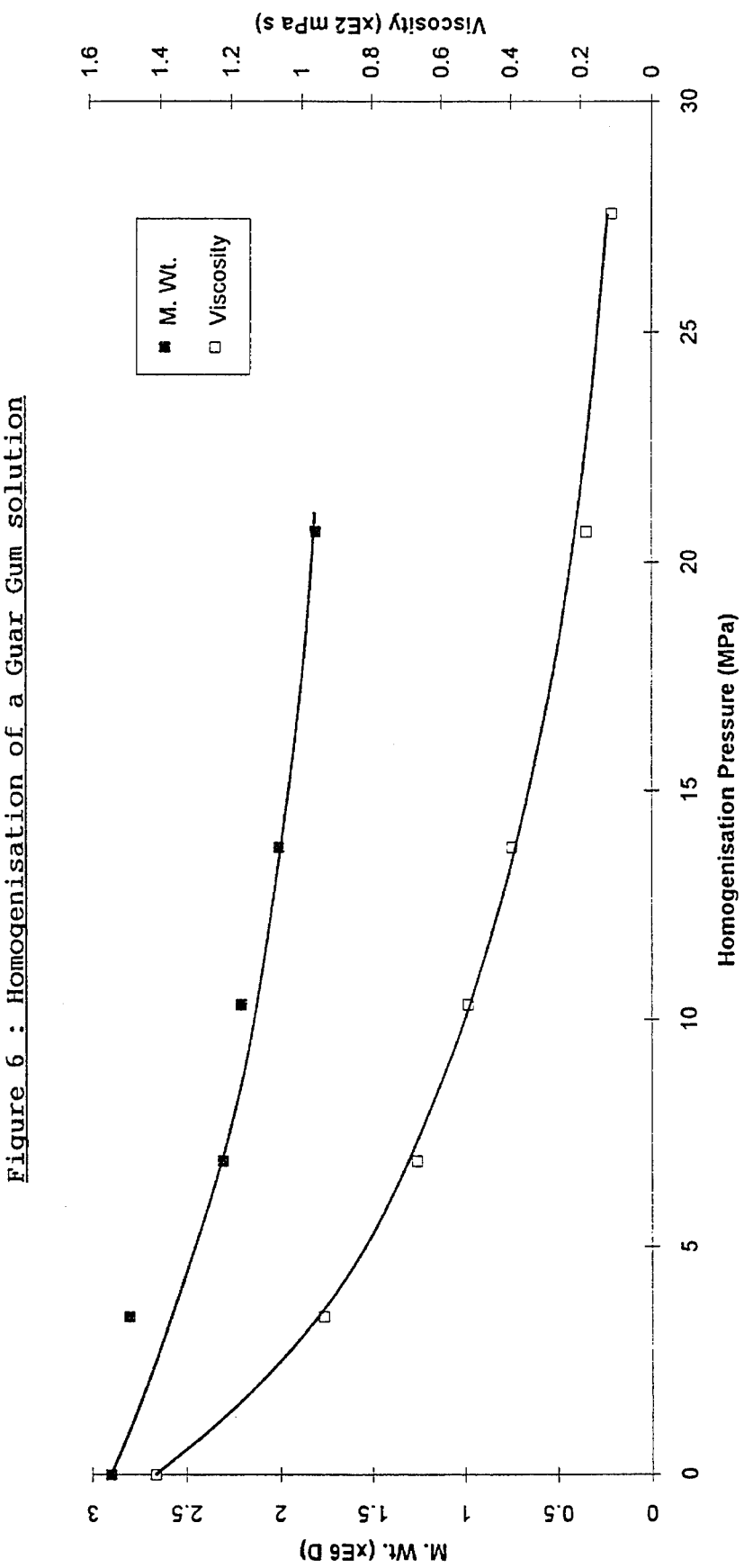
Figure 6 : Homogenisation of a Guar Gum solution

CONTROLLED MOLECULAR WEIGHT REDUCTION OF POLYMERS

BACKGROUND OF THE INVENTION

This invention relates to controlled molecular weight reduction of polymers; more particularly, it relates to a pressure homogenization method which is particularly suitable for weight reduction of polysaccharides.

It has now surprisingly been found that controlled, reproducible molecular weight regulation of polymers, and in particular polysaccharides, such as hyaluronic acid (HA), carboxymethyl cellulose (CMC) and guar gum (GG), may be achieved using the technique of pressure homogenization. The diverse nature of these polysaccharides suggests that the present method may be widely applicable more generally to all polymers. However, as the primary focus of this invention is HA, the present invention will be described with particular reference thereto.

HA is a linear long-chain polysaccharide comprising repeating D-glucoronate and N-acetyl glucosamine disaccharide units. It is species non-specific and may be obtained, for example, either by extraction from animal tissues, e.g. rooster combs and umbilical cords, (Klein, J., & Meyer, F. A., 1983, Biochem. & Biophys. Res. Comm., 755, 400–411), or by removal of HA capsular material form bacterial species, e.g. Streptococcus , (Van Brunt, J., 1986, Biotechnology, 4, 780–782). HA from such sources exists as a mixture of different molecular weight species and the overall weight is expressed as a weight average.

HA has a variety of therapeutic applications, such as opthalmic surgery and post-operative adhesion prevention, as well as having potential uses in a number of other areas. The key to the uses of HA is its hydrodynamic properties (Van Brun, loc cit), producing highly viscous solutions at low concentrations. The viscosity of an HA solution is primarily dependent on the molecular weight, as well as the concentration of the HA.

Viscosity properties may be altered by dilution of the material, but in many applications this is not acceptable. Proposed strategies to produce HA having a variety of molecular weights include the selection of bacterial mutants capable of producing the desired HA molecular weight range or the alteration of the physiological conditions during growth of a bacterium to enhance the production of a particular molecular weight range. However, neither of these techniques could provide both the range and diversity of molecular weight species required for specific applications.

Alternatively, reduction of high molecular weight HA to moieties of lower molecular weight may be achieved by enzymatic, chemical or physical means. Enzymatic methods of degrading HA are known, (Hamai, A., et al, 1989, Agric. Biol. Chem., 58(8), 2163– 2168), but are relatively uncontrollable and tend to broaden the HA molecular weight distribution, therefore making the material unsuitable for certain applications where highly defined molecular weight ranges are required. Chemical methods (Harris, M. J., et al, 1972, JACS, 94, 7570–7572), suffer similar problems and, moreover may result in residual concentrations of the reacting chemicals remaining in a therapeutic product. Fractionation of HA into defined molecular weight species is feasible (Armand, G., & Reyes, M., 1983, Biochem. & Biophys. Res. Comm., 112(1), 168–175), but is a complex operation and so is not easily controllable in large scale manufacture.

With regard to physical means, it has long been a generally held belief that long-chain polysaccharides are shear-sensitive. Recently, the use of a high shear disc stack centrifuge for cell removal from fermentation broth due to the process volume was attempted and, surprisingly, little or no reduction in overall molecular weight of the HA was observed. This suggested that the polysaccharide is less shear-sensitive than previously thought. Given the existing requirements for HA of various molecular weights, several possibilities had been considered. Pressure homogenization had not previously been considered due to the high shear generated, but, given the surprising observation that HA is less shear-sensitive than expected, pressure homogenization has now been investigated as a means for the controlled molecular weight reduction of such polysaccharides, as well as other polymers.

SUMMARY OF THE INVENTION

The present invention provides a method for the controlled molecular weight reduction of polymers, particularly polysaccharide polymers such as HA. The method of this invention comprises subjecting the polymer to pressure homogenization for a sufficient time to achieve the desired molecular weight reduction.

The degree of molecular weight reduction is dependent on the amount of pressure applied, and the number of passages through the homogenized HA molecular weights of from 1.2 to $1.5 \times 10^6$ D can be achieved in a single passage using pressures of from 5 to 20 MPa. HA molecular weights of less than about 100,000 D can be obtained using multiple passages and pressures of at least about 100 MPa.

BRIEF DESCRIPTION OF THE DRAWINGS

FIG. 1 is a graph illustrating the effect of pressure on the molecular weight and viscosity of an HA-containing cell-free broth.

FIG. 2 is a graph illustrating the effect of pressure on the molecular weight and viscosity of a 0.1% HA solution.

FIG. 3 is a graph illustrating the effect of pressure on the molecular weight and viscosity of a 0.4% HA solution.

FIG. 4 is a graph illustrating the effect of pressure on the molecular weight and viscosity of an HA/CTAB solution.

FIG. 5 is a graph illustrating the effect of pressure on the molecular weight and viscosity of a CMC solution.

FIG. 6 is a graph illustrating the effect of pressure on the molecular weight and viscosity of a solution of GG.

DETAILED DESCRIPTION OF THE INVENTION

Pressure homogenizers have a wide range of uses and are generally capable of operating at pressures up to approximately 275 MPa (40,000 psig), more commonly up to approximately 105 MPa (15,000 psig). Pressure homogenization has been used for a long time both in the ferentation industry, at higher pressures, to disrupt cells (Keshavarz, E., et al, 1987, "Separations for Biotechnology", Ed. Verrall & Hudson, Chap. 3, 62–79) and in the dairy industry to reduce the size of fat globules in dairy products (Phipps, L. W., 1976N.I.R.D., Paper 4426, 61–82), but the use thereof in the controlled reduction of the molecular weight of polymers, in particular polysaccharides, has not been previously reported.

A number of known pressure homogenizers from independent manufacturers, e.g. APV, Rannie, Constant Systems and Bran & Luebbe, working on similar principles, but differing in detail, all perform in a similar manner for the present purposes.

While working pressures of up to ~275 MPa are available with commercial apparatus as indicated above, it would be more usual to think in terms of maximum pressures of up to ~105 MPa. A given material, e.g. a solution of HA, may be passaged one or more times, perhaps up to twenty or even more times, in order to achieve a desired result. As will be appreciated, it may be more practical to seek a particular molecular weight reduction by means of several passages at one pressure, rather than one passage at another pressure, the result of the available options being generally equivalent. The inter-relationship between the result to be achieved, the pressure to be applied and the number of applications of pressure or passages will be well-understood by those skilled in the art and may be investigated as necessary and implemented with a not unreasonable amount of routine experimentation. Although the choice of form of a feed material may have some slight effect on an optimum combination of processing conditions, such is generally not particularly significant. It is well-within the competence of one of average skill in the art to arrive at a convenient combination of conditions to provide a desired result in a particular case.

For example, using an HA solution, a reduction in molecular weight from $~2 \times 10^6$D to $~1 \times 10^6$D might involve a single passage at pressures of up to 30 MPa, preferably from 15 to 27 MPa, while a reduction to below $1 \times 10^5$D might involve, say, 20 passages at ~100 MPa.

Some of the preferred embodiments of the present invention are as follows:

1. In order to provide a molecular weight of form 1.2 to $1.5 \times 10^6$D, an HA/CTAB solution is subjected to pressure homogenization in a single passage at a pressure of from 10 to 25 MPa.
2. In order to provide a molecular weight of from 1.2 to $1.5 \times 10^6$D, a purified HA solution or an HA cell-free broth is subjected to pressure homogenization in a single passage at a pressure of from 5 to 20 MPa.
3. In order to provide an HA molecular weight of less than about 100,000 D, the feed material is subjected to pressure homogenization in multiple passages, preferably at least 20 passages, at a high pressure, preferably at least 100 MPa.

Furthermore, tight polydispersity, generally of less than 2, demonstrate normal distributions and indicate the present molecular weight reduction to be well-defined, controlled and dependent primarily on the pressure of passage through the homogenizer. The advantageous molecular weight reduction is not simply a result of production of a wider range of variable molecular weight fragments.

Processing through the homogenizer is not dependent on time as volume throughput is fixed and is limited only by the size of the machine, which may be scaled appropriate to the volumes to be processed. Passage through the machine increases the temperature of the, say, polysaccharide solution dependent on the pressure applied, but this is not generally significant provided the feed solution is held at or below room temperature.

From generated reference data, it is possible, given the initial weight average molecular weight to calculate the pressure at which to passage the HA, for example, to achieve specific target molecular weights. The desired reduction in the weight average molecular weight of the HA may be demonstrated and followed by apparent viscosity measurements. Apparent viscosity measurements may be related to HA molecular weight following analysis by multiangle laser light scattering (MALLS) or intrinsic viscosity measurements (Ubbelhode viscometry), for example. For analysis of low molecular weight species, high pressure liquid chromatography (HPLc) and polyacrylamide gel electrophoresis (PAGE) techniques, for example, are more appropriate.

The HA may be present as cell-free fermentation broth, purified HA dissolved in saline solutions/water or as HA/cetyl trimethyl ammonium bromide (CTAB) (process intermediate) dissolved in saline solution.

The preferred embodiment involves fermentation of *Streptococcus zooepidemicus* with separation of the HA form the bacterial cells. The cell-free broth produced by this process may then be precipitated using a polycationic detergent, e.g. CTAB. The HA/CTAB may then be resuspended in saline solution and passaged through a pressure homogenizer to achieve the desired molecular weight reduction. The present technique is equally applicable to cell-free fermentation broth or redissolved HA.

Following molecular weight reduction, the HA solution may be purified using known techniques. The HA solution is typically purified using mechanical means, such as by the use of a depth filter. It has been found that the addition of hydroxyapatite to the HA solution is effective in absorbing nucleic acids from the solution. Using this approach, the addition of a minimum of 0.017 grams of hydroxyapatite has been found effective to remove 10 micrograms of nucleic acid from the HA solution. The hydroxyapatite may be conveniently removed from the solution with the depth filter.

The present invention provides a method by which, knowing the relationship between apparent viscosity and the molecular weight of the HA contained in solution, it is possible to reduce the molecular weight of the HA to a desired specific range by passage(s) through the homogenizer at a pressure determined from previously generated data. The major advantage of using pressure homogenization to control the weight average molecular weight of such polysaccharides in particular is that the technique is predictable, reproducible, controllable and avoids treatment with chemicals or enzymes which must then be neutralized or removed. The technique illustrated is as appropriate to a solution of purified polysaccharides as to the same polymer in a cell-free fermentation broth and may be applied to a variety of polymers regardless of molecular weight or concentration.

By measurement of apparent viscosities of inlet and exit streams from a pressure homogenizer, the molecular weight reduction achieved may be extrapolated form previous data prepared to predict molecular weight and apparent viscosity at any given polymer concentration. The mode of operation of a pressure homogenizer also makes it unlikely that the controlled molecular weight reduction observed would differ markedly for different size machines, different flow rates or different manufacturers' machines. This has been confirmed using machines of various sizes from independent suppliers, e.g. APV Manton-Gaulin MC4, Rannie Mini-Lab 8.30H and Alfa-Laval Bran & Luebbe SHL 120. The present technique allows the rapid production of, for example, polysaccharide polymer of a given weight average molecular weight for specific applications.

The following examples are intended to further illustrate the present invention without limiting it thereby:

EXAMPLE 1

As indicated above, a convenient source of HA is form anaerobic fermentation of *Streptococcus zooepidemicus* under physiological conditions optimized to produce large quantities of high molecular weight capsular HA. The cells were harvested after a fermentation of 14–24 hours. The capsular HA was then removed and the cells were killed by treatment with a weak polycationic detergent for, say, up to 2 hours, sufficient to completely decapsulate the cells and reduce viable cell counts to zero. The cells were then separated from the HA solution either by filtration or centrifugation.

The resultant HA-containing cell-free broth was then passaged through the pressure homogenizer (APV Manton-Gaulin MC4) at a stepped range of pressures up to ~41.4 MPa (6000 psig) at room temperature.

Samples were taken at each pressure setting, molecular weight analysis carried out by MALLS and the process followed by apparent viscosity measurements.

The molecular weight of the HA after passage was plotted against homogenization pressure during passage (see accompanying FIG. 1). The decrease in the weight average molecular weight of the HA was dependent on the pressures during passage of the HA-containing broth.

EXAMPLE 2

Purified HA powder of molecular weight >2×10$^6$D was dissolved in demineralized water (0.1% and 0.4% w/v) and then passaged through a Rannie 8.30H pressure homogenizer at a stepped range of pressures up to ~100 MPa (14500 psig) at room temperature. Samples were taken, apparent viscosity measurements made and MALLS analysis carried out (see accompanying FIGS. 2 and 3).

Molecular weight reduction mirrored that seen when cell-free fermentation broth was used confirming that the production of controlled molecular weight HA could be carried out on purified HA, as well as on cell-free fermentation broth containing HA.

EXAMPLE 3

HA/CTAB (4% w/v) was dissolved in salt solution (NaCl, 1M) and passaged through an Alfa-Lavai Bran & Luebbe SHL 120 pressure homogenizer at a stepped range of pressures up to ~41.4 MPa (6000 psig) at room temperature. Samples were taken, apparent viscosity measurements made and MALLS analysis carried out.

Results again indicate a controlled reduction in molecular weight dependent on homogenization pressure at passage of the HA-containing solution (see accompanying FIG. 4).

EXAMPLE 4

CMC (Sigma, catalogue item C5013) was dissolved in demineralized water (0.5% w/v) and passaged through a Rannie 8.30H pressure homogenizer at a stepped range of pressures up to 41.4 MPa (6000 psig) at room temperature. Samples were taken, apparent viscosity measurements made and MALLS analysis carried out.

Molecular weight reduction was controlled, predictable and reproducible (see accompanying FIG. 5).

The controlled nature of the degradation observed was similar to that for HA solutions confirming that the present technique may be used in particular for polysaccharides other than HA.

EXAMPLE 5

GG (Aqualon, USA) was dissolved in demineralized water (0.4% w/v) and passaged through a Rannie 8.30H pressure homogenizer at pressures up to ~41.4 MPa (6000 psig) at room temperature. Samples were taken, apparent viscosity measurements made and MALLS analysis carried out.

Molecular weight reduction was again controlled and predictable (see accompanying FIG. 6), demonstrating a similar trend to that observed with other polysaccharides exemplified, confirming the general applicability of the present method to polysaccharides and similarly to other polymers.

EXAMPLE 6

Purified HA powder of molecular weight >2×10$^6$D was dissolved in demineralized water (0.1% w/v) and passaged through a Rannie 8.30H pressure homogenizer 10 or 20 times at a constant pressure of ~100 MPa (14,500 psig). Samples were taken, apparent viscosity measurements made and HPLC or PAGE analysis carried out (see Table below).

The molecular weight reduction confirmed that very low molecular weight fragments may be achieved by multiple passages through a pressure homogenizer to levels where the pressure involved in a corresponding single passage reduction in molecular weight might be prohibitive.

| Applied Pressure (MPa) | Number of Passages | Average M. Wt. (kD) | Apparent Viscosity (mPas) |
|---|---|---|---|
| 0 | 0 | 2200 | 40.4 |
| 100 | 10 | 180 | 3.14 |
| 100 | 20 | 84 | 2.81 |

What is claimed is:

1. A method for the controlled number average molecular weight reduction of an aqueous solution of hyaluronic acid comprising:

subjecting the hyaluronic acid to pressure homogenization in a single passage at a pressure of from about 10 to about 25 MPa, and obtaining a hyaluronic acid solution wherein said hyaluronic acid has a number average molecular weight of from about 1.2 to about 1.5×10$^6$D.

* * * * *